Dec. 8, 1964   C. C. MINTER   3,159,998
VACUUM GAGE AND LEAK DETECTOR
Filed March 16, 1962
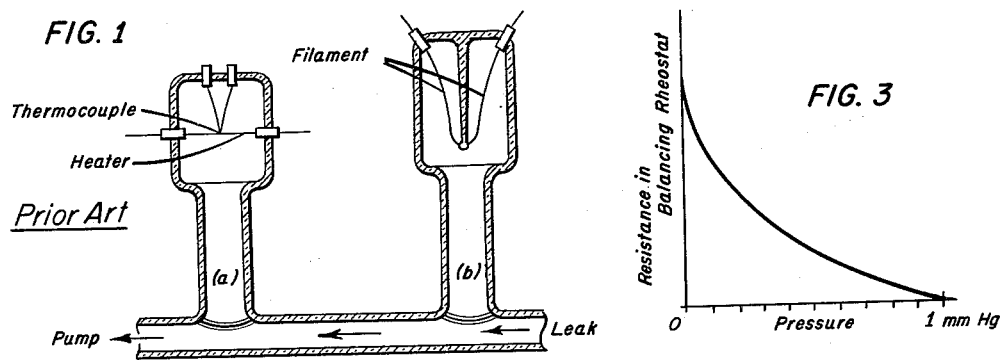
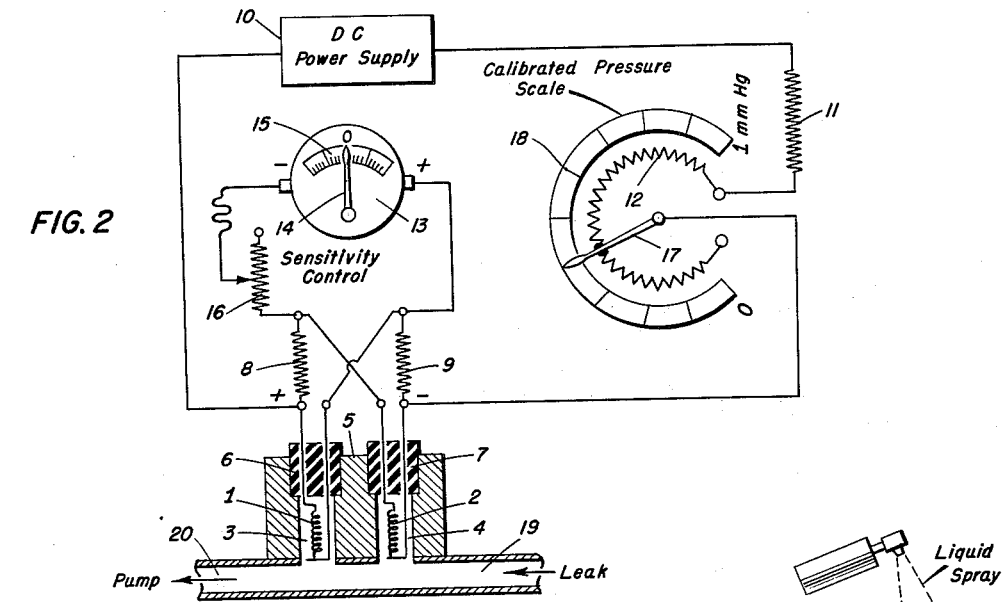
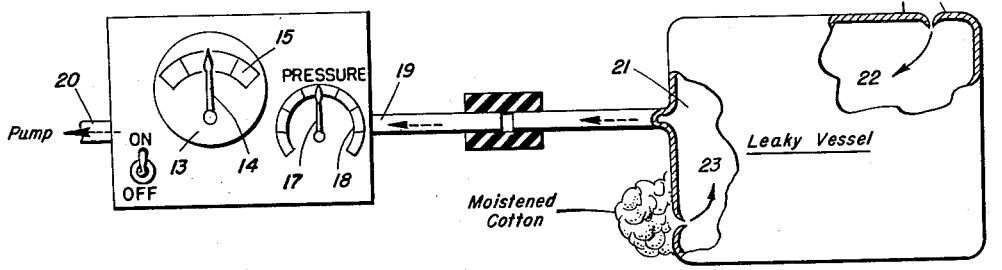
INVENTOR
Clarke C. Minter United States Patent Office 3,159,998
Patented Dec. 8, 1964

3,159,998
VACUUM GAGE AND LEAK DETECTOR
Clarke C. Minter, 1517 30th St. NW., Washington, D.C.
Filed Mar. 16, 1962, Ser. No. 180,193
2 Claims. (Cl. 73—40.7)

This invention relates to vacuum-testing devices and discloses a novel method of converting a pressure-measuring thermal conductivity bridge into a sensitive leak detector by probing for leaks with the highly active vapors of certain liquids instead of with fixed gases.

This application is a continuation-in-part of my co-pending application, Serial No. 58,145, now abandoned, filed September 23, 1960, for "System for Leak Detection."

Prior art devices combining the functions of indicating the pressure in a system under evacuation and for locating leaks in that system are well known at the present time but they are large and expensive assemblies of several parts each having a different function, such as the combination of instruments for indicating the pressure in the system and a mass spectrometer for locating the leaks. A simple device in which both functions can be combined to a limited extent is the hot-wire thermocouple which will give an indication of the pressure in a system under evacuation and also an indication of the small change in pressure which occurs when a gas other than air flows into the system through a leak. Since the change in pressure is rather small the hotwire thermocouple is not a very sensitive leak detector and only the largest leaks can be located with such a device.

Another disadvantage of the hotwire thermocouple as a leak detector is that when normally used as a pressure gage the deflection of the indicator pointer depends on the pressure in the system and small variations in pressure can cause only small changes in the deflection of the indicator. This makes it difficult to distinguish between normal fluctuations of pressure in a system being evacuated and the small changes in pressure produced when probe gas flows through a leak instead of air. This difficulty is eliminated by means of the present invention in which a nullpoint indicator in combination with a calibrated rheostat is used to measure pressure in the system and the effects of pressure fluctuations on bridge balance are negligible because the output from the bridge is not amplified. Because of the large deflection produced by the use of vapors instead of gases to detect and locate leaks in the system relatively small leaks can be detected by means of the present invention.

Still another disadvantage of the vacuum thermocouple is that the sensitive element is too far removed from the tube through which pass the gases flowing from the leak to the pump and when a bit of probe gas or vapor flows through the leak instead of air it has a tendency to flow past the tube connecting to the detector element and not much can diffuse up as far as the detector. This is the same disadvantage that obtains when the Pirani gage, a well known device for measuring pressure in an evacuated system is also used as a leak detector.

The principal object of this invention, therefore, is to provide a circuit containing a current-heated temperature-sensitive wire mounted as close as possible to but not actually in the stream of air flowing from the leaky vessel under test to the vacuum pump.

Another object of this invention is to provide a thermal conductivity bridge circuit which by means of a simple adjustment can indicate the absolute pressure in the system at the point or points where the sensitive element or elements of the bridge are located.

Still another object of this invention is to minimize the effect of the usual fluctuations in pressure in a system under evacuation by eliminating the amplifier normally used in the output circuit of a bridge type thermal conductivity leak detector.

A final object of this invention is to provide a method of converting such a stable pressure-measuring thermal conductivity bridge into a sensitive leak detector by probing for leaks with the more thermally conductive vapors of certain liquids instead of with helium or any other fixed gas.

Other objects and advantages of this invention can be clearly understood by referring to the description below and to the attached figures of which—

FIG. 1 shows schematically the sensitive element of two prior art devices of (a) the vacuum thermocouple pressure indicator and (b) the Pirani gage;

FIG. 2 shows a schematic representation of the present invention;

FIG. 3 shows the graph of resistance necessary to balance the bridge of FIG. 2 versus pressure in the system, and FIG. 4 shows schematically the vacuum gage employed as a leak detector, using the vapors of certain liquids when probing for leaks in a vessel under evacuation.

It can readily be seen from FIG. 1 why the hotwire thermocouple and the Pirani gage tube, both of which have been used to measure pressure in systems under evacuation, are not as suitable for use as a leak detector as the thermal conductivity bridge of FIG. 2. In FIG. 1 the hotwire detector in both prior art designs is mounted in a vessel of relatively large free volume located at distances ranging up to six inches from the tube carrying gases from the leaky vessel being evacuated to the vacuum pump. Even when probe gas flows continuously it would take an appreciable time for the probe gas to reach the sensitive elements located so far from the stream flowing from the leak to the pump. By locating the sensitive element in a cell of small volume as close as possible to the stream of gas flowing to the pump it is readily seen that the design shown in FIG. 2 would not have any of the undesirable lag characteristics of those shown in FIG. 1.

In FIG. 2 two similar current-heated filaments 1 and 2 are suitably mounted in cells 3 and 4 drilled into metal block 5. 6 and 7 are vacuum-tight insulators carrying current leads and supports for the filaments. 8 and 9 are suitable inert resistance elements which, together with filaments 1 and 2, form a Wheatstone bridge. 10 is a power supply of constant D.C. voltage. 11 is a fixed resistance and 12 is a variable resistance of suitable value, both resistances being connected in series with each other and with the bridge and power supply. 13 is a sensitive nullpoint indicator having a pointer 14 and a suitable scale 15. 16 is a variable resistance of high value in series with the indicator for varying the sensitivity of the indicator when the bridge is used as a leak detector. 17 is a sliding contact with pointer attached to indicate on scale 18 how much resistance of variable resistor 12 is added to fixed resistor 11 to balance the bridge and give an indication on scale 18 of the pressure in the system. 19 is a tube for connecting bridgeblock 5 to the vessel 21 under test for leaks while 20 is a tube for connecting the bridgeblock to the vacuum pump.

The action of variable resistor 12 in balancing the bridge as the pressure in cells 3 and 4 is varied consists in regulating the current flowing through the bridge so as to vary the temperature and the resistance of filaments 1 and 2 which have a suitably high temperature-coefficient of resistance.

FIG. 3 contains a graph showing how bridge-balancing resistance 12 varies with pressure in the system. The total resistance of 12 relative to 11 will depend on the range of pressure shown on scale 18. In FIG. 2 the range is shown as 0–1 mm. Hg, but other ranges can be used such as 0–100 microns, etc., in which case the relative resistances of 11 and 12 have to be changed accordingly.

FIG. 4 shows the combined vacuum gage and leak detector connected to a leaky vessel 21 through tube 19. Air is shown leaking in at points 22 and 23. When the vessel is evacuated as low as possible the bridge is balanced by adjusting resistance 12 until there is no deflection on nullpoint indicator 13. The approximate relative magnitude of the leak can be determined by reading the pressure as shown by the position of pointer 17 on scale 18. After the bridge has been balanced, it can be used as a leak detector to locate leaks in the vessel being evacuated. The method of converting the pressure-measuring thermal conductivity bridge into a sensitive leak detector consists in introducing through a leak at low pressure the thermally highly conductive vapors of certain liquids instead of helium or any other probe gas. Obviously, the leak cannot conveniently be brought into contact with such a pure vapor except by the process of covering the leak with a probe liquid having sufficient volatility at room temperature.

FIG. 4 shows two methods of applying the probe liquid, a liquid spray for leak 22 and a moistened cotton pad for leak 23. Plugging a leak with the liquid stops the flow of air and the pressure in the system drops appreciably when only vapor of the liquid passes in at a pressure corresponding to the vapor pressure of the liquid at the temperature of the test. If distilled water is used as probe liquid the vapor pressure is only 20–25 mm. Hg which means that the drop in pressure for the vapor in going through the leak is only 20–25 mm. Hg instead of, say, 750 mm. Hg for air at atmospheric pressure. A fixed gas at atmospheric pressure loses some of its internal energy in flowing through the leak because of the large amount of viscous work done in flowing through such a large drop in pressure. On the other hand, a pure vapor flowing through the leak unmixed with air drops through a pressure of only 25 mm. Hg, for example, doing very little viscous work at the expense of its internal energy, and as a consequence its thermal conductivity is much higher than that of air or a probe gas after flowing through a leak. If a jet of hydrogen is played over a leak, the thermal conductivity of the gas reaching the filaments is much greater than when air flows through the leak, but when a leak is covered with distilled water the output of the bridge is more than 20 times as great as when hydrogen is used as probe gas.

If the leak is covered with any liquid having an appreciable vapor pressure at room temperature some effect is obtained, but bridge output is greatest with liquids having a high latent heat of vaporization, such as water and the alcohols or acetone, which also have the additional advantage of low surface tension.

While only limited embodiments of this invention have been described it is understood that modifications and variations may be made without departing from the spirit and scope of the invention as defined by the appended claims.

What is claimed is:

1. Vacuum gage and leak detector comprising in combination a conduit of suitable dimensions for conducting gases flowing from a vessel being evacuated to a vacuum pump, two similar current-heated temperature-sensitive filaments mounted as close as possible to but not in the stream of gases flowing through said conduit and forming one diagonal of a Wheatstone bridge, two similar inert resistances on the other diagonal, means for simultaneously balancing the bridge and measuring the absolute pressure in the conduit, and means for plugging a leak in the vessel being evacuated while introducing therethrough instead of air the low pressure vapor of a liquid having a high latent heat of vaporization.

2. Vacuum gage and leak detector comprising in combination a Wheatstone bridge containing on one diagonal two similar inert resistances and on the other diagonal two similar temperature-sensitive filaments mounted immediately adjacent to but not in the stream of gases flowing from a vessel being evacuated to a vacuum pump, a power source in series with said bridge and with a resistance of which a portion can be varied to regulate the current through and to balance the bridge while moving a pointer over a scale to indicate the pressure of the gas surrounding the filaments, and means for covering a leak in the vessel being evacuated with a liquid having a high latent heat of vaporization.

References Cited by the Examiner

UNITED STATES PATENTS

| | | | |
|---|---|---|---|
| 2,591,761 | 4/52 | Zaikowsky | 73—27 |
| 2,645,117 | 7/53 | Bendix et al. | 73—49.2 |
| 2,759,354 | 8/56 | Cherry et al. | 73—27 |
| 2,884,591 | 4/59 | Snyder. | |

OTHER REFERENCES

Journal of Scientific Instruments, vol. 30, No. 10, October 1953; pages 385–386 relied upon.

Review of Scientific Instruments, vol. 29, No. 9, September 1958; pages 793, 794 relied upon.

Review of Scientific Instruments, vol. 31, No. 4, April 1960; pages 458–459 relied upon.

ISAAC LISANN, *Primary Examiner.*

ROBERT L. EVANS, *Examiner.*